United States Patent [19]

Machida et al.

[11] Patent Number: 5,559,932
[45] Date of Patent: Sep. 24, 1996

[54] PRINTER AND COMPUTER SYSTEM WITH DETACHABLE BUILT-IN PRINTER

[75] Inventors: Tetsuo Machida, Tokyo; Toshihiko Matsuda, deceased, late of Owariasahi, by Michiko Matsuda, Satomi Matsuda, legal representatives; Akihiro Kawaoka, Owariasahi; Toshinori Kajiura, Ichinomiya, all of Japan

[73] Assignee: Hitachi, Ltd., Tokyo, Japan

[21] Appl. No.: 379,767

[22] Filed: Jan. 27, 1995

[30] Foreign Application Priority Data

Jan. 31, 1994 [JP] Japan .................. 6-009504

[51] Int. Cl.⁶ .................................. G06F 15/00
[52] U.S. Cl. .................... 395/114; 395/101; 361/686
[58] Field of Search .................... 395/112, 114, 395/117, 101, 106, 107, 108, 113; 361/683, 686; 400/691, 680; 364/708.1, 707, 710.13

[56] References Cited

U.S. PATENT DOCUMENTS

| | | | |
|---|---|---|---|
| 4,769,764 | 9/1988 | Levanon | 364/708 |
| 5,045,967 | 9/1991 | Igarashi | 395/117 |
| 5,182,697 | 1/1993 | I-Shou | 361/683 |
| 5,364,196 | 11/1994 | Baitz et al. | 400/691 |

*Primary Examiner*—Mark R. Powell
*Assistant Examiner*—Dov Popovici
*Attorney, Agent, or Firm*—Antonelli, Terry, Stout & Kraus

[57] ABSTRACT

A detachable built-in printer for printing print data supplied from a computer has at least an interface controller for interfacing with the computer, a print pattern generator, a printing unit, and a printer controller for controlling the whole operation of the printer, respectively assembled on a PC card in conformity with PCMCIA/JEIDA. A computer system with a detachable built-in printer is configured by a computer with a PC card slot and the detachable built-in printer inserted into the PC card slot. It is therefore possible to realize a printer capable of being detachably connected to and built in a computer, and a computer system with such a built-in and removable printer.

10 Claims, 2 Drawing Sheets

PRINTER AND COMPUTER SYSTEM WITH DETACHABLE BUILT-IN PRINTER

BACKGROUND OF THE INVENTION

1. Field of the Invention

The present invention generally relates to a printer and a computer system with a printer. More particularly, the invention relates to a small portable printer capable of being detachably connected to and built in a small portable computer, and a computer system with such a small portable printer.

2. Description of the Related Art

A conventional printer connectable to a computer is assembled in a housing different from the computer housing, and signals are sent and received to and from the computer via a cable or another connection medium. As computers are becoming smaller, there arise the needs of carrying a computer and using it outdoors as well as using it at a fixed position. Similarly, there arise the needs of carrying a printer and a computer and using them outdoors.

Although these user's needs can be achieved, transportation and outdoor use are inconvenient because it is necessary to carry both a printer and a computer which are assembled in different housings, and to prepare different installation areas.

Many word processors made of a computer with a built-in printer have been released. Although it is easy to carry a word processor assembled in a single housing and a necessary installation area is small, it is inconvenient in that the printer is always attached even if it is not used.

SUMMARY OF THE INVENTION

The present invention has been made under the above-described circumstances. An object of the present invention is to solve the above-described problems associated with conventional technology, and more particular to provide a printer capable of being detachably connected to and built in a computer, and a computer system with such a printer. Other objects of the invention will become apparent from the following detailed description.

The above and other objects of the invention are achieved through the provision of a printer connectable to a computer for printing print data supplied from the computer. The printer includes: interfacing means for interfacing with the computer; print pattern generating means for converting print data supplied from the computer via the interfacing means into print image data; printing means for receiving the print image data generated by the print pattern generating means, synchronously with print timings, and printing the print image data on a recording sheet; sheet feeder controlling means for feeding the recording sheet synchronously with print timings; and printer controlling means for controlling all of the interfacing means, the print pattern generating means, the printing means, and the sheet feeder controlling means. The interfacing means, the print pattern generating means, the printing means, the sheet feeder controlling means, and said printer controlling means preferably are assembled on a PC card (hereinafter simply called "a PC card") in conformity with PCMCIA (PC Memory Card International Association)/JEIDA (Japan Electronic Industry Development Association). A computer system with a detachable built-in printer in accordance with the present invention may be configured to include a computer with a PC card slot with the detachable built-in printer being inserted into the PC card slot. A PC card in conformity with PCMCIA/JEIDA is preferably a card of type II (86.5 mm or longer * 54.0 mm * 5.0 mm) or type III (86.5 mm or longer * 54.0 mm * 10.5 mm) of the JEIDA version 4.1 standards.

The printer of the invention is assembled on a PC card in conformity with PCMCIA/JEIDA. It is therefore possible to use it as a built-in printer of a computer having a PC card slot. Furthermore, since a detachable built-in printer can be mounted on a computer system when necessary, or can be detached therefrom when unnecessary, usage of the computer system can be improved.

DESCRIPTION OF THE PREFERRED EMBODIMENTS

An embodiment of the invention will be described in detail with reference to the accompanying drawings.

Figure 1:
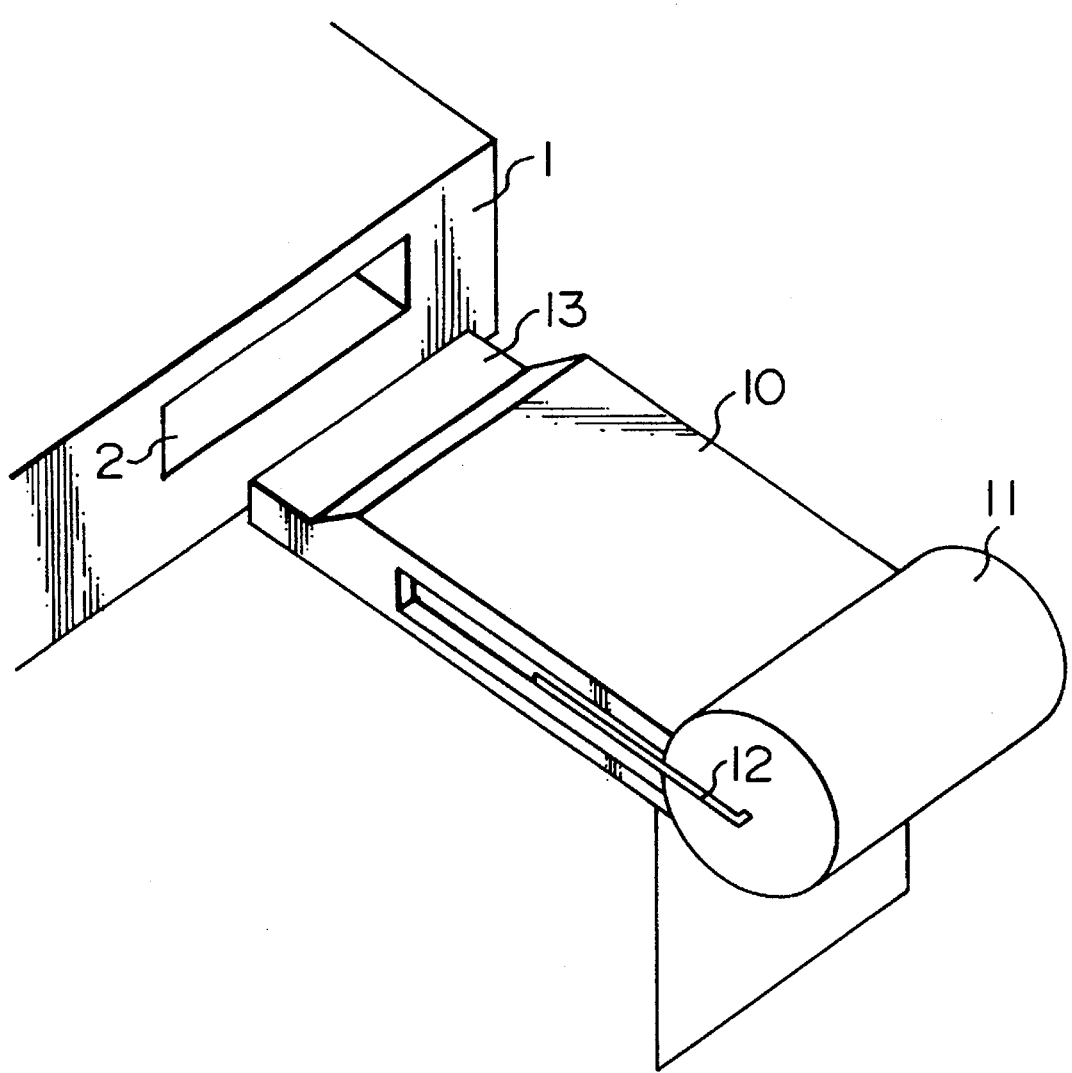
FIG. 1 is a perspective view of a printer according to an embodiment of the invention.

FIG. 1 is a perspective view of a card type printer (hereinafter simply called a "printer"). In FIG. 1, reference numeral 1 represents a computer to which a printer is connected. The computer 1 has a PC card slot 2. A printer generally represented by reference numeral 10 has a structure which has been adapted to be insertable into the PC card slot 2.

The printer 10 is inserted into the PC card slot 2 of the computer 1 and is electrically connected by a connector 13 to the computer 1. A roll of recording paper 11 is set to the printer 10 at one end thereof opposite to the connector 13. Arms 12 for supporting and fixing the recording sheet 11 are mounted on both side walls of the printer 10. The arms 12 are energized by springs (not shown) or the like to push the recording sheet 11 toward the printer 10.

In the embodiment shown in FIG. 1, the recording sheet 11 is a roll of continuous paper. The arms 12 have hooks at distal ends thereof which engage with the center hole or core of the roll to hold the recording sheet 11. If the recording sheet 11 is a single sheet, the sheet may be supported by a rubber roller coupled between the right and left arms 12.

The size of the printer 10 is in conformity with the JEIDA standards, so as to allow it to be inserted into the PC card slot 2 of the computer 1. Specifically, the short side is 54.0 mm, the thickness is 5.0 mm for the PC card slot 2 of type II and 10.5 mm for type III, and the thickness of the connector 13 is 5.0 mm for both types II and III.

As the printer 10 of the embodiment is inserted into the PC card slot 2 of the computer 1, the recording sheet 11 is preferable positioned at the outside of the computer 1 to allow a user to handle it. To this end, the longer side of the printer 10 is set longer than 86.5 mm of the JEIDA standard by about 10 mm to 20 mm.

Figure 2:
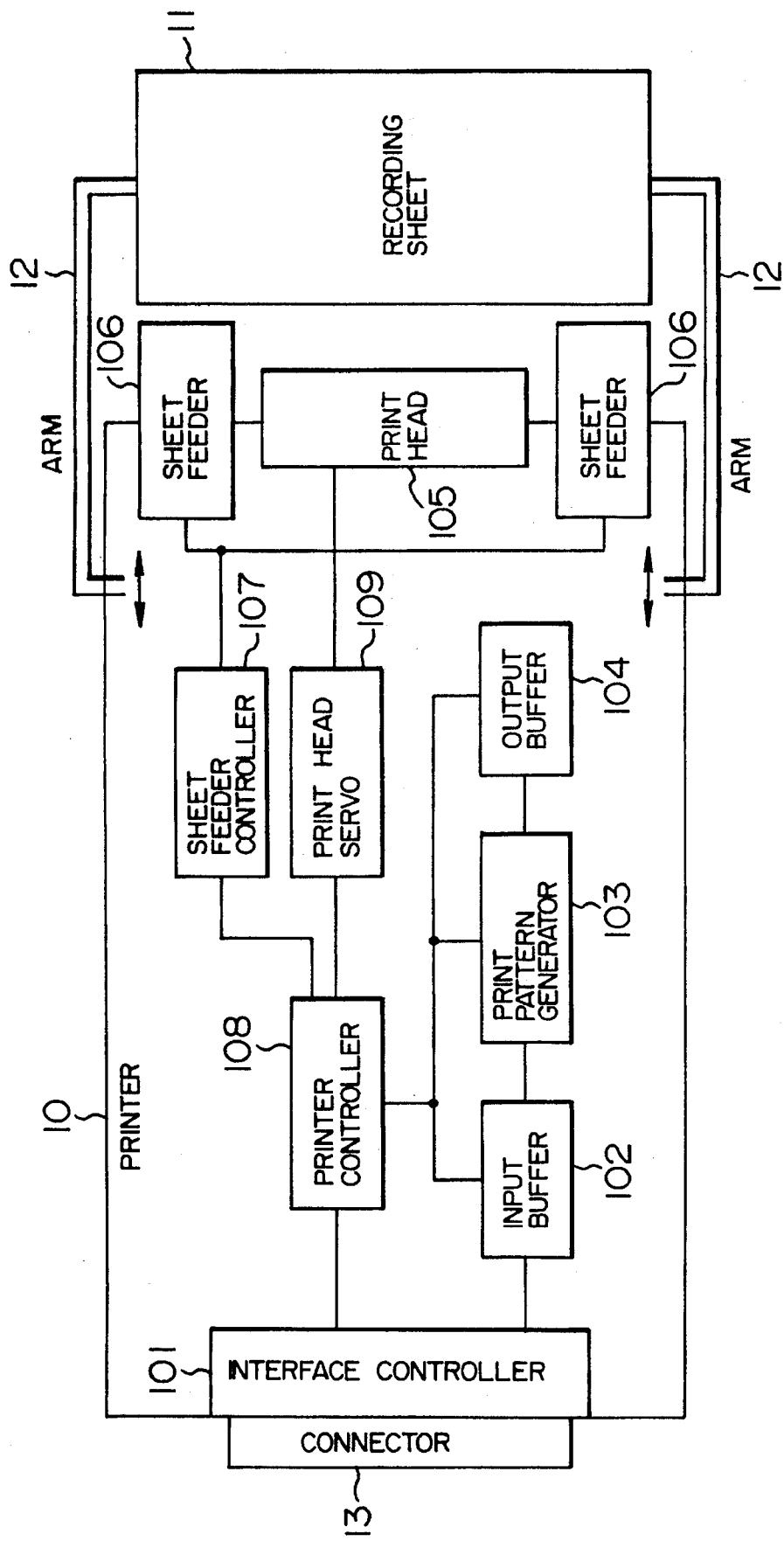
FIG. 2 is a block diagram showing the structure of the preferred embodiment of the printer shown in FIG. 1.

FIG. 2 is a block diagram showing the internal structure of the printer 10. The printer 10 has the recording sheet 11, arms 12 for supporting the roll of recording sheet 11, and connector 13 for providing the connection to the computer 1, as described above. The printer 10 also has the following constituent elements in order to execute a print operation.

An interface controller 101 changes the level and timings of signals transferred to and from the computer 1 via the connector 13 so as to provide matching between the printer 10 and the computer 1. An input buffer 102 temporarily stores print data received via the interface controller 101. A print pattern generator 103 converts the received print data into print dot data. An output buffer 104 temporarily stores dot data converted by and outputted from the print pattern generator 103. A print head 105 prints the dot data read from the output buffer 104 synchronously with print timings. Sheet feeders 106 feed the recording sheet 11 synchronously with print timings. A sheet feeder controller 107 controls the sheet feeders 106. A print head servo 109 controls the position of the print head 105. A printer controller 108 controls the operations of the above-described constituent elements.

Next, the operation of the embodiment constructed as above will be described.

Print data supplied to the printer 10 via the interface controller 101 is temporarily stored in the input buffer 102 and sent to the print pattern generator 103, where the print data is converted into dot data. If a character code is supplied as the print data, the print pattern generator 103 converts it into a corresponding character font. If graphic data is supplied as the print data, it is converted into dot data in accordance with a graphics command.

If dot image data is supplied, it is outputted without converting it. If the graphic data or character code data is developed by the computer 1 into dot image data and this dot image data is supplied, it is also outputted without converting it. The dot data converted by and outputted from the print pattern generator 103 is temporarily stored in the output buffer 104. The print head 105 prints the dot data stored in and read from the output buffer 104 synchronously with print timings, sequentially on the recording sheet.

The print head 105 may be a thermosensitive type or thermal transfer type head. The recording sheet 11 is fed by the sheet feeders 106 synchronously with print timings. The recording sheet 11 may be a thermosensitive type or thermal transfer type sheet depending on whether the print head 105 is a thermosensitive type or thermal transfer type.

The sheet feeder 106 is constituted by a rubber roller or another rotary member rotated by a motor, and mounted on the printer 10 on the right and left sides of the recording sheet 11. The recording sheet 11 is pushed against the rubber rollers or other rotary members by the arms and the springs (not shown) or the like for biasing the arms toward the printer side. The recording sheet 11 is therefore fed by the rotation of the rubber rollers or other rotary members. If the recording sheet 11 is a roll of recording sheet, the thickness of the roller becomes thinner as the recording sheet 11 is used. However, the distance between the surface of the recording sheet 11 and the print head 105 is maintained constant by the mechanism of the springs or the like which urges to move the arms 12. This mechanism of moving the arms 12 may be other mechanisms so long they operate to maintain a constant distance between the surface of the recording sheet 11 and the print head 105, such as a mechanism of moving the arms 12 in accordance with a thickness of the recording sheet roll detected by a sensor.

The sheet feeder controller 107 detects a line feed timing or the like from print data and controls the sheet feeders 106. The printer controller 108 controls the whole operation of the printer 10. Specifically, the printer controller 108 receives a command from the computer 1 via the interface controller 101, analyzes it, instructs inputting of data to the interface controller 101 and storage of the data in the input buffer 102, and instructs the print pattern generator 103 to read the data in the input buffer 102, convert it into print type data, and store it in the output buffer 104.

The printer controller 108 further instructs the print head 105 to read the data in the output buffer 104 sequentially in the print order and print it on the recording sheet 11.

Under the control of the printer controller 108, the sheet feeder controller 107 receives a line feed timing from the print pattern generator 103 or a line overflow timing from the output buffer 104, instructs the sheet feeders 106 to feed the recording sheet at the timing when a line feed is required. The sheet feeder controller 107 also controls to feed the recording sheet 11 by a necessary amount when the print operation is terminated or when a new roll of recording paper is set.

These circuit components can be assembled easily on a card conforming with the JEIDA standards, by using a circuit board having a thickness as thin as about 0.5 mm and by using surface mount type components.

Power to the printer 10 of this embodiment is supplied from the computer 1 via the connector 13. It is therefore not necessary for the printer to have its own power supply or battery, thereby contributing to making the printer compact and light in weight.

A small portable computer to be used with the printer of this embodiment preferably will function to reserve a power necessary to drive the printer, by partially limiting the operations of the computer when the printer is used, such as by distinguishing or darkening the display or by stopping the rotation of a disk.

The embodiment of this invention is intended to be illustrative only, and it is obvious that the invention is not limited only to the embodiment. For example, in this embodiment, although the bottom surface of the printer 10 is flush with the bottom surface of the connector 13, the connector 13 may be mounted at the center of the printer 10 in its width direction.

As described above, it is preferable to partially limit the operations of a small portable computer when the embodiment printer is used. In this case, instead of extinguishing or darkening the display or stopping the rotation of a disk, any other methods may be adopted.

The print head 5 may be any type of print heads so long as it is a small print head mountable on a PC card. Instead of a thermosensitive type print head or a thermal transfer type print head, an ink jet type print head or an electrophotograph type print head such as a laser printer may also be used.

As described in detail, the present invention provides the distinctive effects of realizing a printer capable of being detachably connected to and built in a computer, and a computer system with such a built-in and removable printer.

What is claimed is:

1. A printer, connectable to a computer with a PC card slot, for printing print data supplied from the computer, said computer having a housing with a portion circumscribing said PC card slot, said printer comprising:

interfacing means for interfacing with said computer;

print pattern generating means for converting print data supplied from said computer via said interfacing means into print image data;

printing means for receiving said print image data generated by said print pattern generating means, synchronously with print timing, and printing said print image data on a recording sheet fed synchronously with said print timing; and printer controlling means for controlling all of said interfacing means, said print pattern generating means, and said printing means, wherein said interfacing means, said print pattern generating means, said printing means, and said printer controlling means are assembled in a PC card insertable into said PC card slot.

2. A printer according to claim 1, wherein said PC card is a card of one of the types II and III of the Japan Electronic Industry Development Association version 4.1 standards.

3. A printer according to claim 1, wherein said printing means including one of a thermosensitive type print head and a thermal transfer type print head.

4. A computer system with a detachable built-in printer, comprising:

a computer with a PC card slot, said computer having a housing with a portion circumscribing said PC card slot;

a printer connectable to said computer for printing print data supplied from said computer, said printer including:

interfacing means for interfacing with said computer;

print pattern generating means for converting print data supplied from said computer via said interfacing means into print image data;

printing means for receiving said print image data generated by said print pattern generating means synchronously with print timing, and printing said print image data on a recording sheet fed synchronously with said print timing; and printer controlling means for controlling all of said interfacing means, said print pattern generating means, and said printing means, wherein said interfacing means, said print pattern generating means, said printing means, and said printer controlling means are assembled in a PC card insertable into said PC card slot.

5. A computer system with a detachable built-in printer, comprising:

a computer with a PC card slot; and a printer connectable to said computer for printing print data supplied from said computer, said printer including:

interfacing means for interfacing with said computer;

print pattern generating means for converting print data supplied from said computer via said interfacing means into print image data;

printing means for receiving said print image data generated by said print pattern generating means synchronously with print timing, and printing said print image data on a recording sheet fed synchronously with said print timing; and printer controlling means for controlling all of said interfacing means, said print pattern generating means, and said printing means;

wherein said interfacing means, said print pattern generating means, said printing means, and said printer controlling means are assembled in a PC card insertable into said PC card slot, and said computer includes power conserving means for partially limiting operations of said computer for reserving a necessary power of driving said printer when said printer connected to said computer is used.

6. A computer system with a detachable built-in printer according to claim 5, wherein said computer includes a display device, and said power conserving means extinguishing or darkening said display device.

7. A computer system with a detachable built-in printer according to claim 5, wherein said computer includes a disk drive, and said power conserving means stops the rotation of a disk of said disk drive.

8. A computer system with detachable built-in printer, comprising:

a computer with a PC card slot into which a PC card in conformity with PCMCIA/JEIDA is inserted; and a printer connectable to said computer for printing print data supplied from said computer, said printer being formed in the shape of a PC card in conformity with PCMCIA/JEIDA to be insertable into said PC card slot, said printer including:

interface means for interfacing with said computer, said interface means being in conformity with PCMCIA/JEIDA;

print pattern generating means for converting print data supplied from said computer via said interfaceing means into print image data;

printing means for receiving said print image data generated by said print pattern generating means synchronously with print timing, and printing said print image data on a recording sheet fed synchronously with said print timing; and printer controlling means for controlling all of said interfacing means, said print pattern generating means, and said printing means.

9. A computer system with a detachable built-in printer, comprising:

a computer with a PC card slot for receiving a PC card of one of type II and type III of the JEIDA version 4.1 standards;

a printer connectable to said computer, including print means for printing data supplied from said computer, said printer including an interface in conformity with one of the type II and type III of the JEIDA version 4.1 standards for interfacing with said computer; and said printer being formed in the shape of a PC card of one of the type II and type III of the JEIDA version 4.1 standards to be insertable into said PC card slot.

10. A computer system with a detachable built-in printer, comprising:

a computer with a PC card slot for receiving a PC card having a length, width and thickness greater than 86.5 mm, substantially equal to 54.0 mm and 10.5 mm, respectively;

a printer connectable to said computer, including print means for printing data supplied from said computer, said printer being formed in the shape of the PC card having a length, width and thickness greater than 86.5 mm, substantially equal to 54.0 mm and 10.5 mm, respectively, to be insertable into said PC card slot.

* * * * *